(12) United States Patent
Hsu et al.

(10) Patent No.: US 10,245,521 B2
(45) Date of Patent: Apr. 2, 2019

(54) SPEECH REMOTE CONTROL DEVICE

(71) Applicants: Hung-Wang Hsu, Zhongli (TW); Chun-Hsiang Yang, Zhongli (TW)

(72) Inventors: Hung-Wang Hsu, Zhongli (TW); Chun-Hsiang Yang, Zhongli (TW)

( * ) Notice: Subject to any disclaimer, the term of this patent is extended or adjusted under 35 U.S.C. 154(b) by 0 days.

(21) Appl. No.: 15/634,627

(22) Filed: Jun. 27, 2017

(65) Prior Publication Data

US 2017/0291114 A1 Oct. 12, 2017

Related U.S. Application Data

(63) Continuation-in-part of application No. 14/455,186, filed on Aug. 8, 2014.

(51) Int. Cl.
| | |
|---|---|
| *G10L 15/22* | (2006.01) |
| *G10L 21/00* | (2013.01) |
| *A63H 30/04* | (2006.01) |
| *G10L 15/02* | (2006.01) |
| *G10L 15/065* | (2013.01) |
| *G10L 21/16* | (2013.01) |
| *A63H 17/36* | (2006.01) |
| *G10L 15/28* | (2013.01) |

(52) U.S. Cl.
CPC ............ *A63H 30/04* (2013.01); *A63H 17/36* (2013.01); *G10L 15/02* (2013.01); *G10L 15/065* (2013.01); *G10L 15/22* (2013.01); *G10L 15/28* (2013.01); *G10L 21/16* (2013.01); *A63H 2200/00* (2013.01); *G10L 2015/223* (2013.01)

(58) Field of Classification Search
CPC ... G10L 15/26; G10L 15/22; G10L 2015/223; G10L 15/28; G10L 15/20; G10L 2015/228; G10L 15/00; G10L 17/22; G10L 15/265; G06F 3/167; G06F 8/65; G06F 21/31
USPC .... 704/275, 235, 231, 251, E15.039, 246, 9, 704/E11.001, E15.001; 701/36, 1–2, 41, 701/70

See application file for complete search history.

(56) References Cited

U.S. PATENT DOCUMENTS

| | | |
|---|---|---|
| 4,207,959 A | 6/1980 | Youdin et al. |
| 7,865,176 B2 | 1/2011 | Bell et al. |
| 2004/0103584 A1 | 6/2004 | Freeman |

(Continued)

*Primary Examiner* — Dwayne D Bost
*Assistant Examiner* — Stephen M Brinich
(74) *Attorney, Agent, or Firm* — Rabin & Berdo, P.C.

(57) ABSTRACT

A speech remote control device includes a speech input unit, a speech identification unit, a motion setting unit, a transmit unit and a receiving unit. The speech input unit converts a received speech command into a speech signal. The speech identification unit receives the speech signal, and transmits an encoded message. The motion setting unit receives and decodes the encoded message to generate a combination message with a proceeding control command and a turning control command, or comprising a series of sub-combination messages. The transmitting unit receives and transmits the combination message to the receiving unit provided on the remote control car. The remote control car is driven by the receiving unit to automatically change direction or make more than one turn during proceeding. Thus, only one speech command controls the remote control car to simultaneously proceed and make a turn without sending any additional command for changing direction.

6 Claims, 2 Drawing Sheets

(56) References Cited

U.S. PATENT DOCUMENTS

| | | | |
|---|---|---|---|
| 2008/0036869 A1* | 2/2008 | Gustafsson | H04N 5/23203 348/222.1 |
| 2008/0046238 A1* | 2/2008 | Orcutt | G06F 8/38 704/232 |
| 2009/0299730 A1* | 12/2009 | Joh | G06F 17/273 704/9 |
| 2013/0183944 A1 | 7/2013 | Mozer et al. | |

* cited by examiner

SPEECH REMOTE CONTROL DEVICE

This application is a continuation-in-part of U.S. patent application Ser. No. 14/455,186, filed on Aug. 8, 2014, which is incorporated herewith by reference.

BACKGROUND OF THE INVENTION

1. Field of the Invention

The present invention generally relates to a speech remote control device, and more specifically to a speech remote control device using speech to control a remote control car to perform a stream of operations or traveling motions or simulate various motions of a car.

2. The Prior Arts

In general, it is believed that a remote control car is one of the most popular interactive model toys for adults and kids. A traditional remote control car is controlled remotely by manipulating the joystick, or bar or the keys provided on the remote controller so as to cause the remote control car to perform corresponding motions like moving forward or backward, or turning around.

The control system in the prior arts, the function of controlling the remote control car can be implemented by broadcasting technology like frequency modulation (FM) or amplitude modulation (AM). A remote control car basically comprises a car body, a signal receiving unit and a drive part. Specifically, the signal receiving unit and the drive part are provided in the car body, and electrically connected to each other. When the user sends an operation signal, the signal receiving unit receives and converts the operation signal into an operation command, and the drive part drives the car body to move based on the operation command.

The control direction of the current remote control car is oriented by the head of the remote control car. As a result, it often happens that the proceeding direction of the remote control car is opposite to the direction in which the joystick or bar is pulled by the user during remote control. This problem may cause the remote control car to bump into or get stuck in the obstacle on the way, or even suffer from serious damage.

Poor sensitivity of the joystick and the keys for the user is another drawback. The hardware is actuated and the operation signal is then triggered and transferred to the drive part to move the remote control car. In addition, the user needs to correctly pull or move the joystick/bar or press the keys so as to generate the operation signal, thereby leading to a time delay issue. In other words, it takes some time for the hardware to operate and process the signal. The remote control car possibly fails to move or stop immediately. Hence, the remote control car may easily overturn, collide with an undesired object or get stuck in an obstacle.

The traditional gun-like or joystick controller is provided with an actuating control mechanism for controlling the turning motion and the petrol throttle bar of the remote control car. With the joystick controller, the throttle bar can be manipulated to move upward, downward and turning the throttle bar in the leftwise and rightwise directions so as to cause the remote control car to move forward or backward, stopping, turning and running around. As stated above, movement of the joystick causes delay response action and hence can not result in immediate action of the remote control car. Hence, the remote control car fails to perform continuous motions or simulate a real car's actual motions.

For example, during the road driving examination, the remote control car is required to travel in S direction. But, the currently available remote control car is unable to travel in the S direction, because for the remote control car to travel in the S direction, the operator must first of all manipulate the joystick to the right direction and immediately moves the joystick in an arc route substantially leftwise until the remote control car generally finishes one half of the S turn and then the joystick is turned to the right direction and immediately moves in an arc route substantially rightwise until the remote control car reaches the designated position, thereby finishing another half of the S turn. However, when the operator r pulls the joystick to left from right and vice versa, the remote control car does not respond immediately, thereby leading to a zigzag route rather than the S turn.

Obviously, it is difficult for the remote control car to simulate the motions of the real car. Not only the player loses his interest in playing the remote control car in a short period of time, but also the function and application of the remote control car are extremely limited.

Therefore, it is greatly needed to develop a new remote control design with the feature of real time control so as to cause the remote control car to perform a continuous proceeding motion or a stream of continuous proceeding motions, or further simulate various motions of a real car.

SUMMARY OF THE INVENTION

The primary object of the present invention is to provide a speech remote control device for real time controlling the remote control car to perform a continuous proceeding motion or a stream of continuous proceeding motions.

To achieve the above object, the speech remote control device of the present invention generally comprises a speech input unit, a speech identification unit, a motion setting unit, a transmit unit and a receiving unit. Specifically, the speech input unit is provided in the speech remote control device for receiving a speech command, converting the speech command into a speech signal, and transferring the speech signal.

The speech identification unit is provided in the speech remote control device and connected to the speech input unit for receiving the speech signal. An encoded message corresponding to the speech signal is generated and transmitted. The speech identification unit is built-in with a programmable and rewritable speech identification database comprising a plurality of encoded messages, which are preset and correspond to the plurality of speech signals, respectively. When one of the speech messages preset in the speech identification database is identified by the speech identification unit, the corresponding encoded message is generated and transmitted.

The motion setting unit is provided in the speech remote control device and connected to the speech identification unit for receiving the encoded message, decoding the encoded message to generate and transmit a combination message. The motion setting unit is built-in with a programmable and rewritable motion setting database comprising a plurality of combination messages, which are preset in such a manner to correspond with the plurality of encoded messages, respectively. The combination message comprises a proceeding control command and a turning control command, or the combination message comprises a series of sub-combination messages, each sub-combination messages comprising one proceeding control command and one turning control command. The proceeding control command and the turning control command in the previous sub-combination message are different from the proceeding control command and the turning control command in the latter sub-combination message. The combination message is transmitted through the motion setting unit. If the combination message is the sub-combination messages, the motion setting unit automatically and sequentially transmits the sub-combination messages, wherein the proceeding control command comprises a motor forward turning command, a motor reverse turning command, or a motor initial command.

The transmit unit is provided in the speech remote control device and connected to the motion setting unit for receiving and transmitting the combination message comprising the proceeding control command and the turning control command, and the receiving unit is provided in the remote control car for receiving the combination message comprising the proceeding control command and the turning control command to drive the remote control car to perform a turning-proceeding motion with changing direction during proceeding, or a turning-at-least-one-time-proceeding motion with changing direction at least one time during proceeding. The action of changing direction mentioned above is not only turning, but also includes change from forward/backward to backward forward or other direction change.

With this, the user can directly give a speech command like talking to cause the remote control car to perform the motion corresponding to the speech command, and the time taken by the user pulling control bar and the control bar triggering the control signal is further saved in comparison with the hand-controlled remote device in the prior arts. Further, once the user sends the speech command instead of a series of sequential and continuous speech commands for forward/backward and turning, the remote control car is controlled to proceed and change direction at the same time, thereby fulfilling instant multi-control by one speech command.

As long as the user gives one speech command (like S turn), the remote control car is manipulated to perform a continuous motion or a stream of continuous motions such that the effect of variety for remote control is produced, more precise control is implemented, the function is enhanced and the application field is expanded.

The present invention further provides the entertaining function of playing music and the effect of vibration feedback, thereby greatly improving the fun of playing the remote control car.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
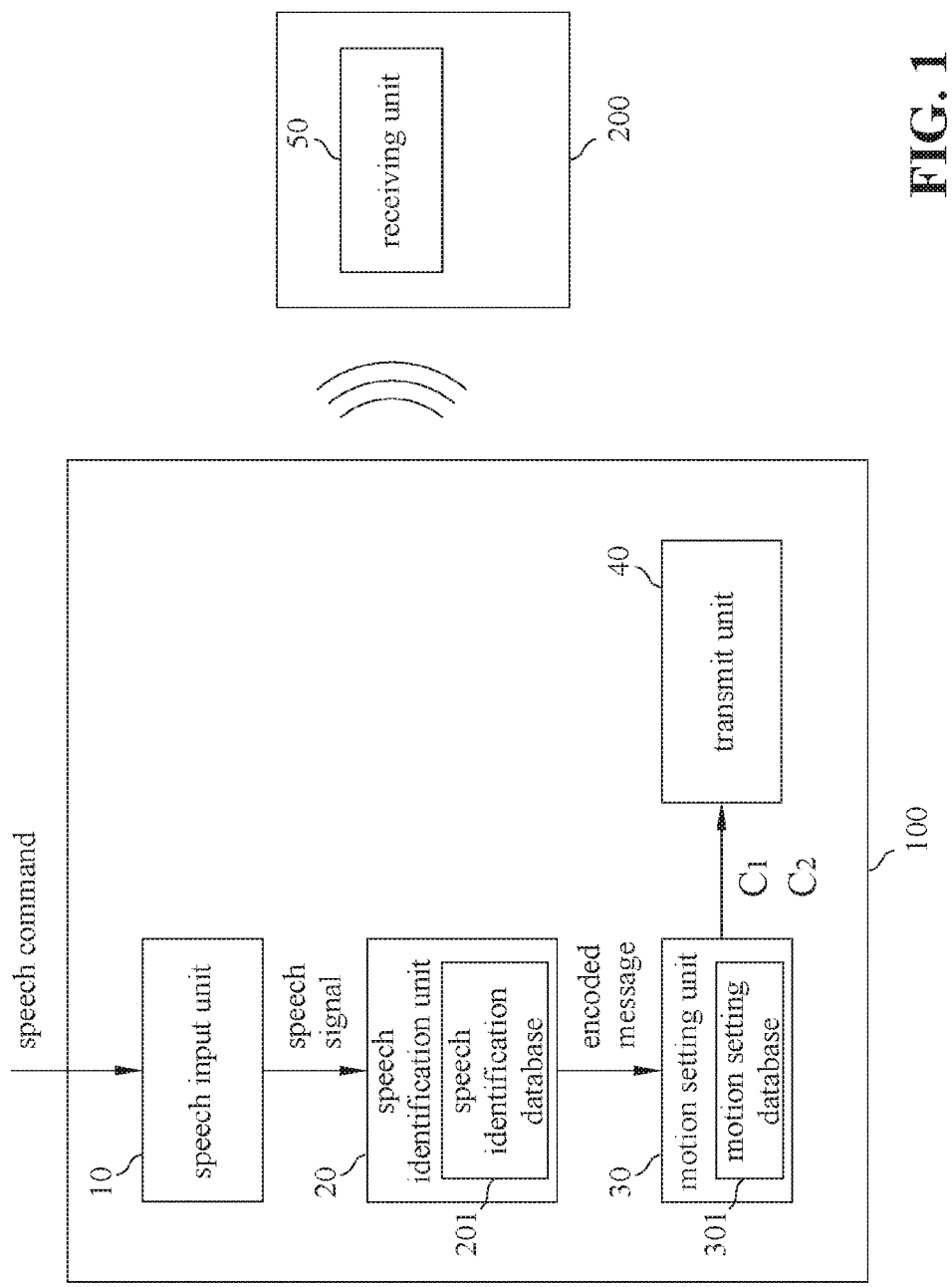
FIG. 1 is a functional block diagram of the speech remote control device according to a first embodiment of the present invention.

Please refer to FIG. 1, illustrating a functional block diagram of the speech remote control device according to the first embodiment of the present invention. As shown in FIG. 1, the speech remote control device 100 is used for controlling a remote control car 200, and comprises s a speech input unit 10, a speech identification unit 20, a motion setting unit 30, a transmit unit 40 and a receiving unit 50.

Specifically, the speech input unit 10, the speech identification unit 20, the motion setting unit 30 and the transmit unit 40 are provided in the speech remote control device 100 while the receiving unit 50 is provided in the remote control car 200.

More specifically, the speech input unit 10 receives a speech command, converts the speech command into a speech signal, and transfers the speech signal. The speech input unit 10 can be implemented by a microphone or other suitable sound receiver.

The speech identification unit 20 is connected to the speech input unit 10 for receiving the speech signal from the speech input unit 10, generating an encoded message corresponding to the speech signal, and transmitting the encoded message. The speech identification unit 20 is built-in with a programmable and rewritable speech identification database 201, which may comprise a plurality of encoded messages. The encoded messages are preset is such a manner to correspond with the plurality of speech signals, respectively. Only when one of the speech messages preset in the speech identification database 201 is identified by the speech identification unit 20, the according encoded message is generated and transmitted. The speech identification unit 20 may comprise a speech identification chip.

The motion setting unit 30 is connected to the speech identification unit 20 for receiving the encoded message from the speech identification unit 20, decoding the encoded message to generate and transmit a combination message. The motion setting unit 30 is built-in with a programmable and rewritable motion setting database 301, which comprises a plurality of combination messages preset in such a manner to correspond with the plurality of encoded messages, respectively. The combination message comprises a proceeding control command $C_1$ and a turning control command $C_2$, or the combination message comprises a series of sub-combination messages, each sub-combination messages comprising one proceeding control command $C_1$ and one turning control command $C_2$. The proceeding control command $C_1$ and the turning control command $C_2$ in the previous sub-combination message are different from the proceeding control command $C_1$ and the turning control command $C_2$ in the latter sub-combination message. In other words, the proceeding control command $C_1$ and the turning control command $C_2$ in the sub-combination message of the combination message change at least one time. The combination message is transmitted by the motion setting unit 30, When the combination message is the sub-combination messages, the motion setting unit 30 sequentially and automatically transmits the sub-combination messages.

It should be noted that each of the units before the motion setting unit 30 receives one input signal and transmits one output signal, but the motion setting unit 30 receives one input signal like the encoded signal, and transmits one combination message including two control commands such as the proceeding control command $C_1$ and the turning control command $C_2$. Thus, the user just speaks out one speech command to generate two control commands, which control two controlled objects for action. Additionally, the proceeding control command. $C_1$ and the turning control command $C_2$ can cause various motion due to different timing. It is obvious that only one speech command is needed to multiplex and control two controlled objects, and two controlled objects can perform two different proceeding motions, respectively, according to a series of the sub-combination messages.

The proceeding control command $C_1$ comprises a motor forward turning command, a motor reverse turning command, or a motor initial command, and the turning control command $C_2$ comprises a right turning command, a left turning command, or a turning initial command. The above motor initial command means to stop the motor, and the turning initial command means to return the turning mechanism to its original state.

The transmit unit 40 is connected to the motion setting unit 30 for receiving the combination message comprising the proceeding control command $C_1$ and the turning control command $C_2$, and transmitting the received combination message.

The receiving unit 50 is provided on the remote control car for receiving the combination message. The remote control car is further provided with a motor driving mechanism and a turning mechanism. Upon receiving the combination message, the receiving unit 50 simultaneously transmits the proceeding control command $C_1$ and the turning control command $C_2$ of the combination message to the motor driving mechanism and the turning mechanism, respectively, such that the motor driving mechanism executes the proceeding control command $C_1$, and at the same time, the turning, mechanism executes the turning control command $C_2$. As a result, the remote control car performs a turning-proceeding motion based on the proceeding control command $C_1$ and the turning control command $C_2$. Furthermore, with any combinations of different proceeding control commands $C_1$ and different turning control command $C_2$, the turning-proceeding motion performed by the remote control car may comprise a forward-left proceeding motion (the proceeding control command $C_1$ is the motor forward command and the turning control command $C_2$ is a left turning command), a forward-right proceeding motion (the proceeding control command $C_1$ is the motor forward command and the turning control command $C_2$ is a right turning command), a backward-left proceeding motion (the proceeding control command $C_1$ is the motor backward command and the turning control command $C_2$ is a left turning command), or a backward-right proceeding motion (the proceeding control command $C_1$ is the motor backward command and the turning control command $C_2$ is a right turning command).

Upon receiving a series of the sub-combination messages, the receiving unit 50 sequentially transmits the sub-combination messages to the motor driving mechanism and the turning mechanism. The motor driving mechanism and the turning mechanism based on the received sub-combination messages drive and control the remote control car to perform a turning-at-least-one-time-proceeding motion with changing direction at least one time during proceeding. Specifically, the remote control car can perform a fast forward or backward proceeding motion, a S-turn proceeding motion, a drifting proceeding motion, or a series of the above proceeding motions. In other words, any proceeding motion comprising at least one turning is within the scope of the present invention. The detailed operation of the control commands for the fast forward or backward proceeding motion, and the S-turn proceeding motion will be described hereinafter.

Therefore, the user just sends the speech command to the speech remote control device 100 to cause the remote control car 200 to perform one continuous proceeding motion or a stream of continuous proceeding motions. The above speech command preferably comprises 'turning', 'turning around', 'quick forward and backward', 'drifting', 'S turning', and so on. The above turning-proceeding motions may comprise 'turning', 'turning around', and so on, and the turning-at-least-one-time-proceeding motion may comprise 'quick forward and backward', 'S turning' , 'drifting', and so on.

To cause the remote control car 200 to perform the 'quick forward and backward' motion, before giving the speech command like 'quick forward and backward', the user needs to preset the speech signal in the speech identification database 201 corresponding to the speech command 'quick forward and backward'. For the convenience of describing the present embodiment, the speech signal corresponding to the speech command 'quick forward and backward' is specified by the speech signal S1, and the encoded message E1 is subsequently preset for the speech signal S1.

Here, the combination message R1 corresponding to the encoded message E1 is preset in the motion setting database 301, and the motion command of the combination message R1 is specified to cause the motor to a fast forward rotation a period of time, then stop, and fast backward rotation for another period of time. Specifically, the proceeding control command. $C_1$ of the combination message can generate the motor forward command during 0-5 second, the motor initial command during 5-5.5 second, and the motor backward command during 5.5-10 second. That is, three different proceeding control commands $C_1$ are sequentially generated and specified for three periods of time, respectively, and the turning control command $C_2$ is kept as the turning initial command during these three periods of time.

In the actual operation, the user needs to give the speech command 'quick forward and backward' to the speech input unit 10 such that the speech input unit 10 converts the speech command 'quick forward and backward' into the speech signal S1, which is transferred to the speech identification unit 20. The speech identification unit 20 performs speech identification, determines if the speech signal S1 is preset in the speech identification database 201, and further determines if the encoded message E1 corresponds to the speech signal S1. If yes, the encoded message El is transferred to the motion setting unit 30, which generates the control message R1 based on the encoded message E1, and transfers the control message R1 to the transmit unit 40. The transmit unit 40 further transmits the combination message R1 to the receiving unit 50, which executes the combination message R1 to cause the remote control car 200 to perform a series of proceeding motions like the 'quick forward and backward' motion.

In one embodiment of the present invention, the transmit unit 40 and the receiving unit 50 are a radio frequency (RF) transmit circuit and a RF receiving circuit, respectively.

The receiving unit 50 is built in a control chip (not shown) connected to the motor driving mechanism and the turning mechanism (not shown) provided in the remote control car so as to control the rotation status of the motor and the turning function of the turning mechanism.

Figure 2:
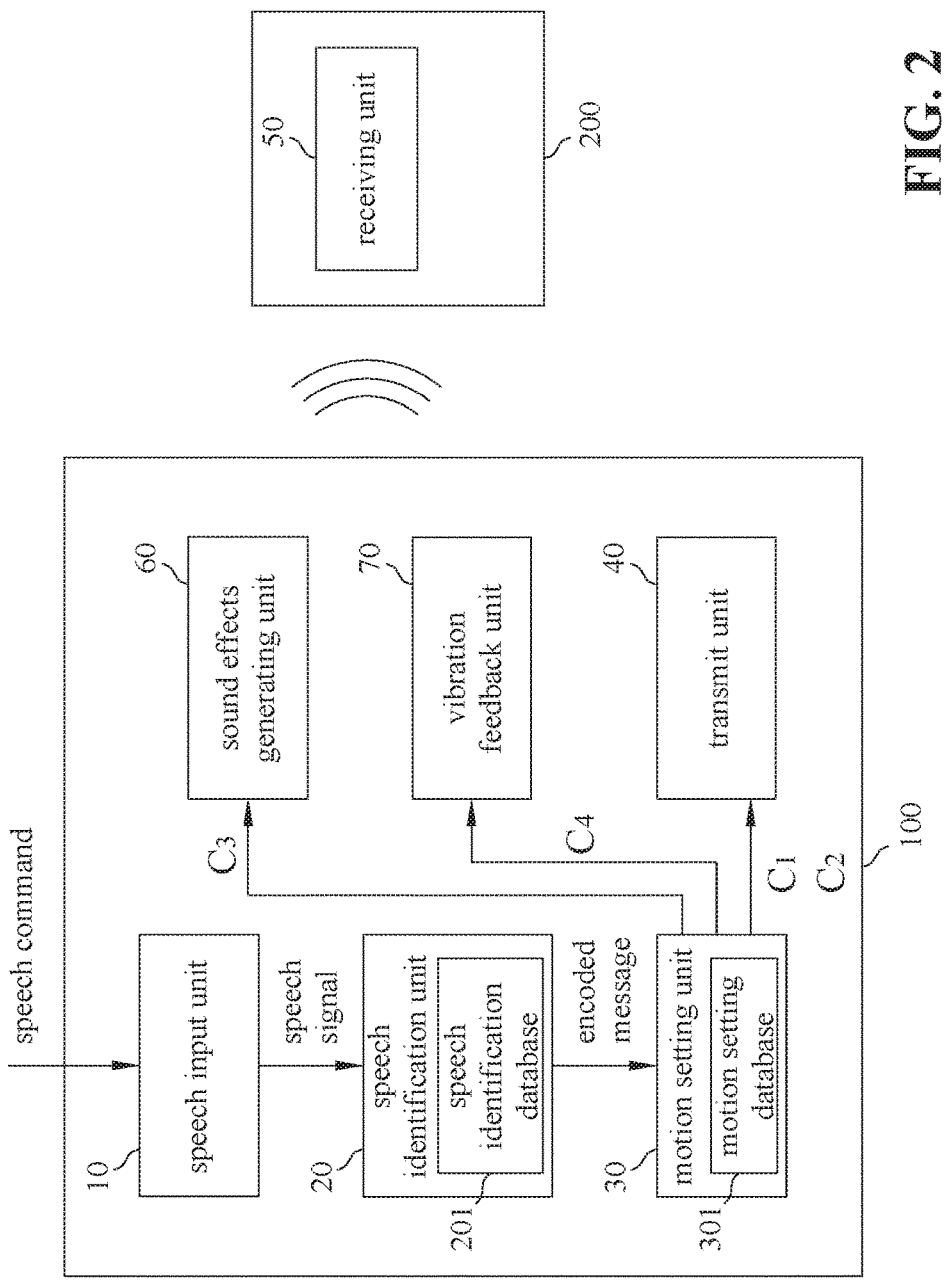
FIG. 2 is a functional block diagram of the speech remote control device according to a second embodiment of the present invention.

Further refer to FIG. 2 showing the functional block diagram of the speech remote control device according to the second embodiment of the present invention. As shown in FIG. 2, the second embodiment of the present invention further comprises a sound effects generating unit 60, which is provided in the speech remote control device 100 and connected to the motion setting unit 30. Here, the combination message further comprises a sound effects command $C_3$, and the motion setting unit 30 transfers the sound effects command $C_3$, the proceeding control commands $C_1$ and the turning control command $C_2$ to the sound effects generating unit 60 such that the sound effects generating unit 60 simultaneously play sound effect while the remote control car executes the proceeding control commands $C_1$ and different turning control command $C_2$ to perform the corresponding proceeding motion.

Furthermore, in the motion setting database 301, the user may preset the combination messages corresponding to the encoded messages, respectively. Thus, when the user wants the remote control car 200 to perform the 'quick forward and backward' motion and at the same time needs the speech remote control device 100 to play music, the combination message only needs to further include the sound effects command $C_3$. Since the sound effects generating unit 60 is connected to motion setting unit 30, the sound effects command $C_3$ is transferred to the sound effects generating unit 60 so as to cause the sound effects generating unit 60 to execute the function of playing some specific sound effect to simulate various sound of the car like engine starting sound, car accelerating sound, car slow down braking sound, car normal sound, horn sound, car collision sound, alarm whistle sound, or a segment of music.

Therefore, the output signal transmitted from the motion setting unit 30 may comprise at least three commands including the proceeding control command $C_1$, the turning control command $C_2$, and the sound effects command $C_3$. As a result, the user needs to send only one speech command to simultaneously control three controlled objects such as controlling the motor driving mechanism to forward/backward rotate, the turning mechanism to make a turn, and the sound effects generating unit to play music or sound effect. In particular, the motor driving mechanism and the turning mechanism are simultaneously controlled to generate a specific proceeding motion lasting for a period of time, and even a series of different proceeding motions are sequentially and automatically caused during a specific period while the sound effects generating unit 40 plays sound effect corresponding to the proceeding motion. Moreover, the user can operate the remote controller to play sound effect so as to impose great fun on the operation of the remote controller.

Additionally, the sound effects generating unit 60 is built-in with a sound effect database comprising pieces of sound effect, and each combination message includes a specific sound effects command. It is preferred that various specific sound effects commands correspond to the pieces of sound effect, respectively.

Therefore, the sound effects generating unit 60 may play the corresponding sound effect based on the specific sound effects command $C_3$, and when the user gives the speech command to the remote control car 200, the speech remote control device 100 of the present embodiment can play the specific sound effect for the present proceeding motion.

In other words, when the remote control car 200 performs one proceeding motion, the speech remote control device 100 can simultaneously play sound effect by itself. For example, before the control process, the user can preset the piece of music 'go! Go! Go!' played by the pop singer Wo-bai in the sound effects generating unit 60, and this music 'go! Go! Go!' is specified for the sound effects command $C_3$ corresponding to the speech command "quick forward and backward" such that the speech remote control device 100 plays the piece of music 'go! Go! Go!' when the remote control car 200 performs the "quick forward and backward" motion.

As shown in FIG. 2, the speech remote control device of the present embodiment further comprises a vibration feedback unit 70, which is provided in the speech remote control device 100 and connected to the motion setting unit 30. The combination message may further comprise a vibration generation command $C_4$, and the motion setting unit 30 transfers the vibration generation command $C_4$ to the vibration feedback unit 70 so as to perform a vibration effect. Preferably, the vibration feedback unit 70 is a vibration generation device.

If the user wants to invoke some specific proceeding motion and play the music and vibration effect at the same time, it simply needs to additionally build up the vibration generation command $C_4$ in the combination message such that the vibration generation command $C_4$ is transferred to the vibration feedback unit 70 from the motion setting unit 30 and the vibration feedback unit 70 is driven to generate the vibration effect as desired. Preferably, the vibration effect is continuously or intermittently generated.

From the above detailed description, one aspect of the present invention is that the user only needs to give the speech command so as to remote manipulate the remote control car to perform the proceeding motion corresponding to the speech command. In comparison with the hand control design the prior arts, the time taken by pulling the control joystick/bar and triggering the control signal is thus saved, and the remote control car can immediately perform the desire motion right after the user sends the speech command, thereby fulfilling the object of real time control.

In the motion setting database, the user may preset the proceeding command for the encoded message. For example, the proceeding command is encoded as one continuous proceeding motion or one stream of proceeding motions formed of a plurality of continuous proceeding motions.

As for the S turn motion, the motor needs to keep rotating, and the turning mechanism first turns right to some suitable content, then, turns left to some suitable content, and finally turns right.

From the above mentioned, the S turn motion primarily consists of three processes such that the proceeding command is encoded into three instruction codes based on the order of the three processes. The transmit unit sequentially transmits the three encoded codes to the receiving unit, and the turning mechanism of the remote control car can sequentially execute the three encoded codes to perform the desired continuous proceeding motions, which implements the S turn motion. Certainly, to keep the motor constantly rotating, the proceeding command may further comprise a forward rotation command to actuate the motor.

More specifically, to correspond with the three processes of the S turn proceeding motion, the control command is intended to sequentially output three proceeding combination message according to three periods of time, respectively. During the first period of time like 0-3 seconds, the proceeding control command $C_1$ is the motor forward command and the turning control command $C_2$ is the turning right command, then during the second period like 3-7 seconds, the turning control command $C_2$ is switched to the turning left command at the moment of 3 second while the proceeding control command $C_1$ is kept as the motor forward command for 4 seconds, and then during the third period like 7 seconds, the turning control command $C_2$ is switched back to the turning right command while the proceeding control command $C_1$ is still the motor forward command.

Another aspect of the present invention is that the user only needs to send the speech command (like S turn) one time, the remote control car can perform one turning-proceeding motion without sequentially sending the speech commands of turning left, turning right, and turning left. Since the motion setting unit generates the combination message including at least two control commands based on the single received coded message through internal process, or even the sound effects command $C_3$ and the vibration generation command $C_4$, the combination message can simultaneously control the motor driving mechanism and the turning mechanism of the remote control car, and the sound effects generating unit also plays sound effect corresponding to the combination message. Therefore, only one single speech command can simultaneously control a plurality of controlled objects, and each controlled object even automatically performs different proceeding motions. Obviously, the control effect becomes versatile and the preciseness of remote control is enhanced such that the function and application field of the remote control car are greatly expanded, and the present invention is used to transport the stuff, and even applicable to the remote device for handling explosive. The present invention further provides the function of playing music and generating the vibration feedback so as to enhance the entertaining effect for the user.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A speech remote control device for controlling a remote control car, comprising:
   a speech input unit provided in the speech remote control device for receiving a speech command, converting the speech command into a speech signal, and transferring the speech signal;
   a speech identification unit provided in the speech remote control device and connected to the speech input unit for receiving the speech signal, and generating and transmitting an encoded message corresponding to the speech signal, wherein the speech identification unit comprises a built-in programmable and rewritable speech identification database, the speech identification database having a plurality of encoded speech messages preset and corresponding to a plurality of speech signals, respectively, and when the speech identification unit identifies one of the plurality of encoded speech messages preset in the speech identification database, the identified encoded speech message is generated and transmitted;
   a motion setting unit provided in the speech remote control device and connected to the speech identification unit for receiving the identified encoded speech message, decoding the identified encoded speech message into a combination message, and transmitting the combination message, the combination message comprising a proceeding control command and a turning control command, or the combination message comprising a series of sub-combination messages, each of the sub-combination messages comprising a proceeding control command and a turning control command, the proceeding control command and the turning control command in a previous sub-combination message being different from the proceeding control command and the turning control command in a latter sub-combination message, the combination message being transmitted through the motion setting unit, wherein if the combination message is a sub-combination message, the motion setting unit automatically and sequentially transmits the sub-combination messages, the proceeding control command comprises a motor forward turning command, a motor reverse turning command, or a motor initial command, and the turning control command comprises a right turning command, a left turning command, or a turning initial command;
   a transmit unit provided in the speech remote control device and connected to the motion setting unit for receiving the combination message comprising the proceeding control command and the turning control command, and transmitting the received combination message;
   a receiving unit provided in the remote control car for receiving the combination message comprising the proceeding control command and the turning control command, wherein the remote control car is provided with a motor driving mechanism and a turning mechanism, and when the combination message is received by the receiving unit, the receiving unit transmits the proceeding control command and the turning control command to the motor driving mechanism and the turning mechanism, respectively, and the motor driving mechanism and the turning mechanism, based on the proceeding control command and the turning control command, drive and control the remote control car to perform a turning-proceeding motion with changing direction during proceeding, the turning-proceeding motion comprising a forward proceeding motion with left turning, a forward proceeding motion with right turning, a backward proceeding motion with left turning, or a backward proceeding motion with right turning according to a combination of a different proceeding control command and a different turning control command, and when the series of sub-combination messages are received by the receiving unit, the receiving unit sequentially transmits the series of sub-combination messages to the motor driving mechanism and the turning mechanism, and the motor driving mechanism and the turning mechanism, based on the series of sub-combination messages, drive and control the remote control car to perform a turning-at-least-one-time-proceeding motion with changing direction at least one time during proceeding, the turning-at-least-one-time-proceeding motion comprising a fast forward or backward proceeding motion, an S-turn proceeding motion, or a drifting proceeding motion; and
   a sound effects generating unit electrically connected to the motion setting unit, wherein the combination message further comprises a sound effects command, the motion setting unit transmits the sound effects command, the proceeding control command, and the turning control command to the sound effects generating unit, and the sound effects generating unit performs a sound effect corresponding to the sound effects command while executing the proceeding control command and the turning control command for the proceeding motion.

2. The speech remote control device as claimed in claim 1, wherein the speech input unit is a microphone.

3. The speech remote control device as claimed in claim 1, wherein the speech identification unit comprises a speech identification chip.

4. The speech remote control device as claimed in claim 1, wherein the transmit unit comprises a radio frequency transmit circuit, and the receiving unit comprises a radio frequency receive circuit.

5. The speech remote control device as claimed in claim 1, further comprising a vibration feedback unit provided in the speech remote control device and connected to the motion setting unit, wherein the combination message further comprises a vibration generation command, the motion setting unit transfers the vibration generation command to the vibration feedback unit so as to perform a vibration effect.

6. The speech remote control device as claimed in claim 5, wherein the vibration feedback unit is a vibration generation device.

* * * * *